C. VAN GEMERT.
CULTIVATOR ATTACHMENT.
APPLICATION FILED NOV. 16, 1918.
1,303,810.
Patented May 13, 1919.
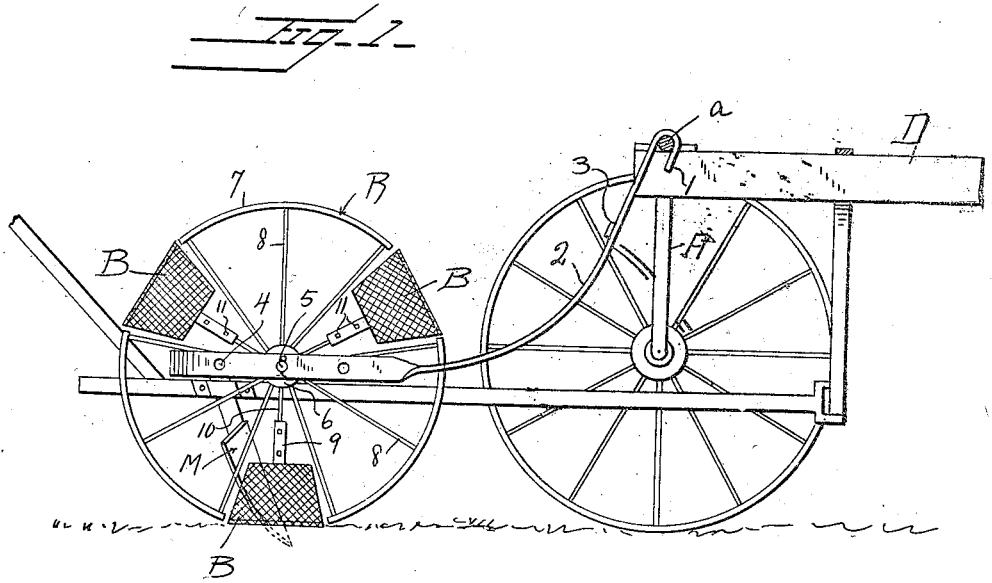
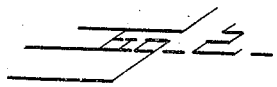
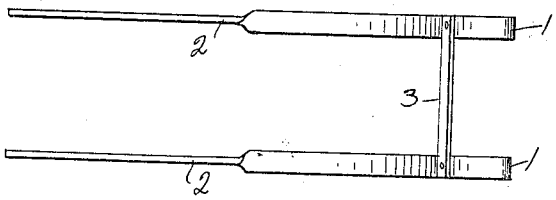
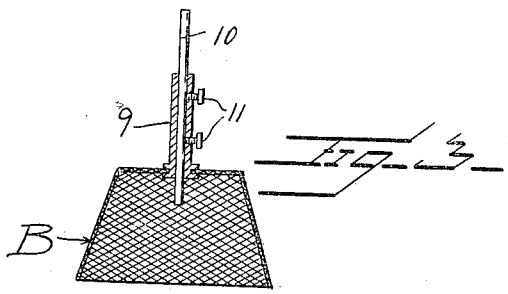
Inventor
C. Van Gemert
By Watson E. Coleman
Attorney

UNITED STATES PATENT OFFICE.

CORNELIUS VAN GEMERT, OF ALBIA, IOWA.

CULTIVATOR ATTACHMENT.

1,303,810.     Specification of Letters Patent.     Patented May 13, 1919.

Application filed November 16, 1913. Serial No. 262,829.

*To all whom it may concern:*

Be it known that I, CORNELIUS VAN GEMERT, a citizen of the United States, residing at Albia, in the county of Monroe and State of Iowa, have invented certain new and useful Improvements in Cultivator Attachments, of which the following is a specification, reference being had to the accompanying drawings.

This invention relates to certain improvements in cultivator attachments, and it is an object of the invention to provide a novel and improved device traveling with a cultivator and operating to prevent the turning over or covering of a hill by the ground-working members of the cultivator.

It is also an object of the invention to provide a novel and improved attachment of this general character comprising a rotatable member provided with a plurality of circumferentially spaced fenders, each of which being adapted to cover or inclose a hill when in contact with the soil so that such hill is protected against destruction by the ground-working members of the cultivator or by the soil turned or loosened thereby.

The invention consists in the details of construction and in the combination and arrangement of the several parts of my improved cultivator attachment whereby certain important advantages are attained and the device rendered simpler, less expensive, and otherwise more convenient and advantageous for use, as will be hereinafter more fully explained.

The novel features of my invention will hereinafter be definitely claimed.

In order that my invention may be the better understood, I will now proceed to describe the same with reference to the accompanying drawings, wherein:

Figure 1 is a longitudinal, vertical, sectional view taken through a cultivator and illustrating in side elevation an attachment constructed in accordance with an embodiment of my invention;

Fig. 2 is a fragmentary view in top plan showing the end portions of the supporting arms engageable with an arch or the like; and Fig. 3 is an enlarged fragmentary view partly in elevation and partly in section illustrating in detail one of the fenders or baskets as herein included, and including means whereby said basket or fender may be adjustably engaged with its support.

As disclosed in the accompanying drawings, D denotes a draft tongue of a straddle row cultivator of any ordinary or preferred type, and which coacts with the arched axle A. Engaged with the horizontal part *a* of the arched axle and at opposite sides of the draft tongue D are the hooks carried by the elongated straps or bars 2. The straps or bars 2 are arranged in transverse spaced relation and the forward end portions are maintained in desired position by the cross bar 3 secured thereto.

The straps or bars 2 are twisted substantially midway their lengths so that the front and rear edges lie at right angles to each other and the rear portions of said straps or bars are provided with a series of longitudinally spaced openings 4 with which coacts the axle or shaft 5 of the wheel R. By this means it will be self-evident that the position of the wheel R may be adjusted longitudinally of the rear end portions of the straps or bars 2, as the occasions of practice may require.

The wheel R is of desired diameter and includes a hub 6 and the arcuate rim sections 7 held to the hub 6 through the medium of the spokes 8.

The ends of adjacent rim sections 7 are in predetermined spaced relation and extending within each of such spaces is a fender B formed preferably of reticulated material and which has secured at substantially the axial center of its base a sleeve 9 through which is loosely disposed a spoke or elongated support 10 rotating from the hub 5. In practice it is preferred that the open or outer face of the fender B be oval shape with its major axis extending in a direction circumferentially of the wheel R. It is also preferred that the depth of the fender be substantially equal to the major width of its outer or open face. By this means the fender B may be adjusted longitudinally of its coacting spoke or support 10, and in order to hold the fender B in its different positions, I employ the binding screws 11 threaded through the sleeve 9 and engaging the spoke or support 10 in a well known manner.

It is to be noted that the wheel R is so positioned as to arrange each fender B when in contact with the soil or ground immediately adjacent a ground-working member M so that the hill over which the fender B is positioned will be protected against being turned over or otherwise destroyed. By having each of the fenders B of reticulated or other perforated material it will be understood that the fine or minute particles of earth may readily pass therethrough in order to facilitate cultivation.

In practice when the cultivator is located at the end of a row, the operator adjusts the wheel R to bring the fender B over an end hill as the fenders B are properly spaced circumferentially of the wheel R, the succeeding hills will be properly covered by fender B as the cultivator travels along a row.

From the foregoing description, it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

An attachment of the class described comprising a wheel including a hub and rim sections secured to the hub, adjacent rim sections being spaced apart, fenders extending within the spaces between the rim sections, each of said fenders having its open face outwardly directed and having its walls perforated, a sleeve secured to each of the fenders at substantially the axial center of its base, an elongated support radiating from the hub of the wheel and extending through the sleeve, and means carried by the sleeve for securing the fender in adjusted positions on the support.

In testimony whereof I hereunto affix my signature in the presence of two witnesses.

CORNELIUS VAN GEMERT.

Witnesses:
GEORGE SEIBERT,
THOS. HICKENLOOPER.